A. J. NOBLE.
RESILIENT TIRE.
APPLICATION FILED JUNE 17, 1918.
1,299,009.
Patented Apr. 1, 1919.
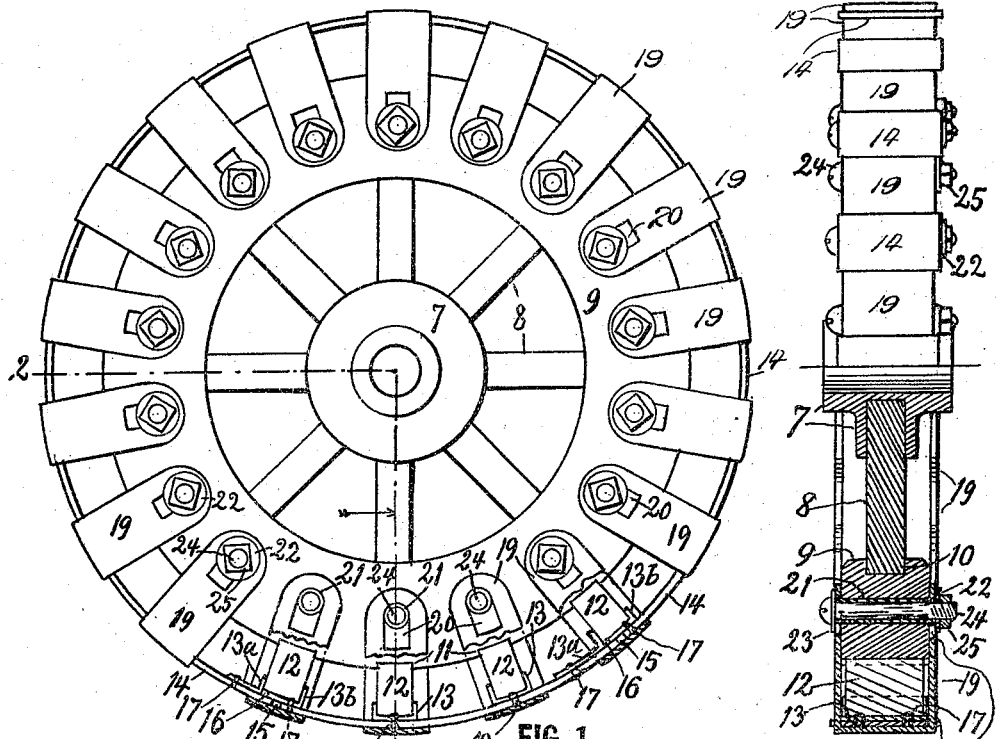
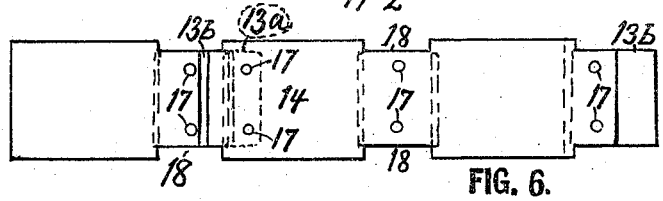
FIG. 6.
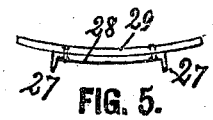
FIG. 5.
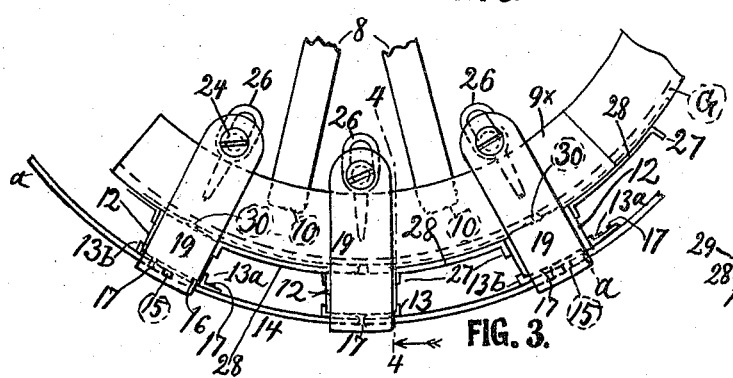
FIG. 3.
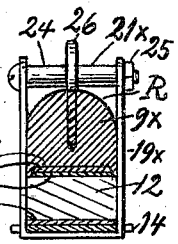
FIG. 4.
INVENTOR:
Andrew J Noble,
BY his ATTORNEY:
A. M. Carlsen.

UNITED STATES PATENT OFFICE.

ANDREW J. NOBLE, OF ST. PAUL, MINNESOTA.

RESILIENT TIRE.

1,299,009. Specification of Letters Patent. Patented Apr. 1, 1919.

Application filed June 17, 1918. Serial No. 240,336.

*To all whom it may concern:*

Be it known that I, ANDREW J. NOBLE, a citizen of the United States, residing at St. Paul, in the county of Ramsey and State of Minnesota, have invented a new and useful Resilient Tire, of which the following is a specification.

My invention relates to resilient tires for the wheels of auto-trucks and other vehicles, and the main object is to provide a resilient or cushion tire especially adapted for heavy vehicles, and which shall have no air cells to puncture, and in which the cushion elements are durable and well protected from injury.

In the accompanying drawing:

Figure 1 is a side elevation of a vehicle wheel provided with my improved tire, with small portions broken away in the lower part. Fig. 2 is a partly sectional edge view of the wheel, as on the line 2—2 in Fig. 1. Fig. 3 is a side view of a portion of a wheel with my tire applied thereto and slightly modified. Fig. 4 is a section on the line 4—4 in Fig. 3. Fig. 5 is a detail side view of one of the double plates 28—29 in Fig. 3. Fig. 6 is a detail bottom view of the ring section extending from *a* to *a* in Fig. 3.

Referring to the drawing by reference numerals, 7 designates the hub, 8 the spokes and 9 the felly of a vehicle wheel which may be of any suitable construction and made out of any suitable materials.

In Figs. 1 and 2 the felly 9 is provided with sockets 10 for the spokes, and in the periphery are notches 11 for the inner ends of rubber blocks 12, or other suitable resilient elements, whose outer ends are held in U-shaped keepers 13 secured upon the inner face of a tread ring 14. Said ring is made in sections, each section may have two of the keepers 13, and at each end a member, either 13$^a$ or 13$^b$, which when the sections are put together make up a keeper 13$^a$—13$^b$, at each joint of the ring. Between the ends of the sections there are normally clearings 15, which are covered by the members 13$^b$, and at the ends of said members are also clearings, 16, (best shown in Fig. 1), said clearings are to permit the ring to contract and expand as each section approaches the ground and rises therefrom again. 17 designate rivets by which the keepers are secured to the ring sections.

The tread ring 14 of the tire is formed with notches 18, (see Fig. 6), in which are loosely fitted the arms of a series of U-shaped clips, 19, which straddle the tread ring, the cushion blocks and the felly, and have each arm provided with a slot 20, in which are placed the projecting ends of tubes 21, as shown in the lower part of Figs. 1 and 2; said tubes are inserted in the felly if the latter is made of wood; if it is made of iron cast ridges take the place of the projecting ends of the tubes; said projections serve to provide clearings for the arms of the clips 19, so they may slide between the felly and washers 22 and 23, which are held tightly against said projections by the head and nut 25 of a bolt 24, as best shown in the lower part of Fig. 2.

In the modification illustrated in Figs. 3, 4, and 5, the felly 9$^x$ is supposed to be of the common wooden type used on auto trucks and cars and having its inner periphery rounded as at R in Fig. 4. To make my improved tire applicable to such a felly and to the usual groove G provided therein for pneumatic tires, I secure in the inner curve of the felly a series of eye-screws 26, whose eyes are elongated in radial direction of the wheel, and in said eyes are placed the tubes 21$^x$ (see Fig. 4 where said tube is shown in longitudinal section) and the bolt 24 and nut 25 applied to hold the clip firmly to the ends of the tube.

In said modification the inner ends of the rubber blocks or other cushions do not enter into notches in the felly but they are held between angular portions 27 of segmental plates 28, which plates are riveted to longer segmental plates 29 (see Fig. 5) and said plates are placed in the groove G of the felly so that the projecting ends of the plates 29 reach almost together near the middle of each cushion element, leaving but a small clearing 30 for such possible movement as may be imparted to the plates by the compressing and expanding of the cushions.

In the use or operation of the device it is readily understood that when the weight of the vehicle and its load compress the cushions as they come between the wheel and the ground, and allow them to expand again as they rise from the ground, the clips move in radial direction of the wheel, either on the tubes 21 or with said tubes, as in Fig. 4; and all the cushions are protected from injury by the arms of the clips at the sides, and by the outer bar of each clip and the tread ring 14 at the peripheric side of the cushion.

What I claim is:

1. The combination with a felly, of a tire comprising a series of resilient elements spaced about the face of the felly, a tread ring bearing against the radially outer sides of said elements and having lateral notches, a series of U-shaped clips crossing the face of the tread ring and having arms placed in said notches and straddling the resilient elements and the felly, said arms being secured to the felly in a manner allowing the arms to slide in radial directions of the wheel as the resilient elements are compressed and expanded.

2. The structure specified in claim 1, and means on the felly and on the tread ring for holding the resilient elements in place one within each clip.

3. The structure specified in claim 1, said tread ring being made in several sections with the ends slightly spaced apart in some of the clips, and means on one end of each section to overlap and slide upon the adjacent end of the next section so as to cover the space between the ends.

In testimony whereof I affix my signature.

ANDREW J. NOBLE.

Copies of this patent may be obtained for five cents each, by addressing the "Commissioner of Patents, Washington, D. C."